(12) United States Patent
Higa

(10) Patent No.: US 7,248,321 B2
(45) Date of Patent: Jul. 24, 2007

(54) LIQUID CRYSTAL DISPLAY DEVICE WITH FIRST AND SECOND ELECTRODE SLITS AND CONVEX PORTIONS AND ELECTRONIC APPARATUS

(75) Inventor: Masakatsu Higa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 57 days.

(21) Appl. No.: 10/909,392

(22) Filed: Aug. 3, 2004

(65) Prior Publication Data

US 2005/0078243 A1    Apr. 14, 2005

(30) Foreign Application Priority Data

Oct. 9, 2003    (JP)    ............... 2003-350947

(51) Int. Cl.
G02F 1/1337    (2006.01)
(52) U.S. Cl. ...................................... 349/129; 349/114
(58) Field of Classification Search ................ 349/114, 349/129, 128
See application file for complete search history.

(56) References Cited

U.S. PATENT DOCUMENTS 6,449,025 B2 *   9/2002   Lee ............................. 349/129
6,788,375 B2     9/2004   Ogishima et al.
6,967,702 B2 *  11/2005   Ishii et al. .................. 349/123

FOREIGN PATENT DOCUMENTS

| JP | A 11-242225 | 9/1999 |
|----|----|----|
| JP | A 2001-100211 | 4/2001 |
| JP | A-2002-341342 | 11/2002 |
| JP | A 2003-167253 | 6/2003 |
| JP | A-2003-195287 | 7/2003 |
| KR | A 2002-0079583 | 10/2002 |

OTHER PUBLICATIONS

Makoto Jisaki et al.; "Development of transflective LCD for high contrast and wide viewing angle by using homeotropic alignment"; Asia Display/IDW '01; 2001; pp. 113-136.

* cited by examiner

Primary Examiner—Andrew Schechter
Assistant Examiner—Richard H Kim
(74) Attorney, Agent, or Firm—Oliff & Berridge, PLC

(57) ABSTRACT

Aspects of the invention can provide a transflective liquid crystal display device of vertical alignment mode capable of suitably controlling the direction that liquid crystal molecules are tilted. The liquid crystal display device can include a liquid crystal layer interposed between a pair of substrate and transmissive and reflective display regions in each dot region. An insulating film for varying the thickness of the liquid crystal layer in the reflective and transmissive display regions is provided. On a substrate having the insulating film formed thereon, an electrode slit for controlling the alignment of the liquid crystal molecules can be formed in the reflective display region. Similarly, a convex portion for controlling the alignment of the liquid crystal molecules can be formed in the transmissive display region.

5 Claims, 7 Drawing Sheets

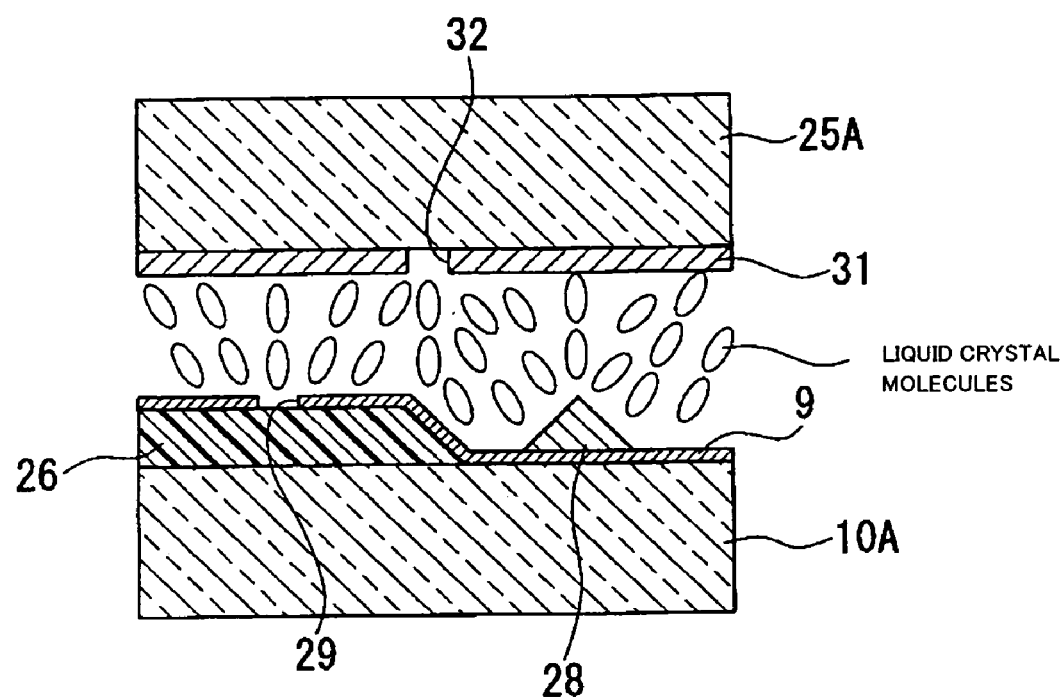
F I G. 4

LIQUID CRYSTAL DISPLAY DEVICE WITH FIRST AND SECOND ELECTRODE SLITS AND CONVEX PORTIONS AND ELECTRONIC APPARATUS

BACKGROUND OF THE INVENTION

1. Field of Invention

The present invention relates to a liquid crystal display device and an electronic apparatus, and more particularly, to a liquid crystal display device using vertical alignment type liquid crystals.

2. Description of Related Art

Related liquid display device can include a transflective liquid crystal display device operated in alignment direction, when a voltage is applied, of the liquid crystal molecule reflective and transmissive modes. As such a transflective liquid crystal display device, there has been proposed a transflective liquid crystal display device in which a liquid crystal layer is interposed between upper and lower substrates, a reflecting film made of metal, such as aluminum where light-transmitting window is formed, for example, is provided on an inner surface of the lower substrate, and the reflecting film also serves as a transflective plate. In this case, in the reflective mode, external light enters the upper substrate, passes through the liquid crystal layer, reflects from a reflecting film on the inner surface of the lower substrate, passes through the liquid crystal layer again, and exits from the upper substrate, so that display can be made. In the transmissive mode, light of a backlight enters the lower substrate, passes through the window portion of the reflecting film, passes through the liquid crystal layer, and exits from the upper substrate to the outside, so that display can be made. Therefore, a portion, of the region where the reflecting film is formed, where the window portion is formed, serves as the transmissive display region, and the remaining portion serve as the reflective display region.

In the related transflective liquid crystal display device, there can be a problem in that a viewing angle in the transmissive display is narrow. This problem is involved in the limitation that a transflective plate is provided in the inner surface of the liquid crystal cell in order to prevent parallax, and thus, the reflective display is performed with only one polarizing plate provided on observer's side, so that the degree of freedom in an optical design is lowered. In order to solve the problem, in "Development of transflective LCD for high contrast and wide viewing angle by using homeotropic alignment", M. Jisaki et al., Asia Display/ID W'01, p. 133–136 (2001), there is proposed a new liquid crystal display device using vertically aligned liquid crystal molecules. The characteristics thereof are as follows:

(1) A VA (vertical alignment) mode is employed. In the VA mode, liquid crystal molecules whose dielectric anisotropy is negative are vertically aligned on a substrate, and when a voltage is applied, the liquid crystal molecules are allowed to tilt.

(2) A multi-gap structure is employed. In the multi-gap structure, the thickness of the liquid crystal layer in the transmissive and reflective regions are made different from each other.

(3) An alignment division structure is employed. In the alignment division structure, the transmissive display region has a shape of regular octagon, and a protrusion is provided at the center of the transmissive display region on the opposite substrate in order to allow the liquid crystal molecules within the transmissive display region to be tilted in all directions.

On the other hand, in Japanese Unexamined Patent Application Publication No. Heisei 11-242225 there is disclosed a technique for forming a slit in an electrode as alignment controlling means of liquid crystal molecules other than the aforementioned protrusion when the vertically aligned liquid crystal is used.

As described above, the direction that the liquid crystal molecules are tilted in the transmissive display region can be controlled using the protrusion provided at the center of the transmissive display region. However, a device for controlling the direction that the liquid crystal molecules are tilted in the reflective display region is not mentioned. If the direction that liquid crystal molecules are tilted is not controlled and the liquid crystal molecules are tilted disorderly, discontinuous lines, called "disclination", occur at the boundary between different liquid crystal alignment regions, so that afterimage may be generated. In addition, since the alignment regions of the liquid crystal have different viewing characteristics, there is a problem in that a spotted pattern may be generated as the liquid crystal display device is viewed from an oblique direction.

In addition, in Japanese Unexamined Patent Application Publication No. Heisei 11-242225, the direction that the liquid crystal molecules are tilted is controlled using the protrusion or using a transverse electric field generated by providing the slit to the electrode. However, this approach is provided for only the transmissive liquid crystal display device, but it is not suitably provided for a transflective liquid crystal display device using alignment direction, when a voltage is applied, of the liquid crystal molecule reflective and transmissive modes.

SUMMARY OF THE INVENTION

Aspects of the invention can provide a transflective liquid crystal display device of vertical alignment mode capable of suitably controlling the direction that liquid crystal molecules are tilted. In addition, it is another aspect of the invention to provide a liquid crystal display device capable of suppressing display defects, such an afterimage and a spotted pattern, and moreover, providing a wide viewing angle. In particular, the invention can provide a liquid crystal display device capable of obtaining uniform display in alignment direction, when a voltage is applied, of the liquid crystal molecule reflective and transmissive display modes and a wide viewing angle.

Moreover, the invention can provide an electronic apparatus having the aforementioned liquid crystal display device.

The present invention can provide a liquid crystal display device including a liquid crystal layer interposed between a pair of substrates, and transmissive and reflective display regions provided in each dot region for performing transmissive display and reflective display, respectively. Electrodes can be provided on facing surfaces of the pair of substrates. The liquid crystal layer can include liquid crystal having a negative dielectric anisotropy, whose initial alignment state is vertical. A liquid-crystal-layer thickness-adjusting layer can be formed on one of the facing surfaces of the pair of substrates in the reflective display region so that the thickness of the liquid crystal layer in the reflective display region is smaller than the thickness of the liquid crystal layer in the transmissive display region. An electrode slit formed by cutting a portion of one of the electrodes and a convex portion protruding from one of the facing surfaces of the substrates into the liquid crystal layer are used as an alignment controlling device for controlling the tilting direction, when a voltage is applied, of liquid crystal molecules whose initial alignment state is vertical, and wherein, in the substrate having the liquid-crystal-layer thickness-adjusting layer formed thereon, only the electrode slit of the alignment controlling means is selectively formed in the reflective display region, and at least the convex portion of the alignment controlling means is selectively formed in the transmissive display region.

The liquid crystal display device of the invention can be a combination of a transflective liquid crystal display device and vertically aligned liquid crystal molecule, particularly, in order to perform a high contrast display in both the reflective and transmissive modes and control the alignment direction, when a voltage is applied, of the liquid crystal molecules used in the vertical alignment mode.

In the reflective display mode, incident light, such as external light, passes though the liquid crystal layer twice and reaches an observer, while, in the transmissive display mode, incident light from a backlight passes through the liquid crystal layer once and reaches the observer. Therefore, if any device for controlling the thickness of the liquid crystal layer is not provided, the retardation values in the reflective and transmissive display regions are different from each other. As a result, in alignment direction, when a voltage is applied, of the liquid crystal molecule display modes, a high contrast display cannot be obtained, so that it is difficult to obtain a high brightness display.

In addition, in a case where the vertical alignment mode is employed, although negative liquid crystal is used, the liquid crystal molecules which are vertically aligned on the substrate surface in an initial alignment state are tilted by applying a voltage. Therefore, if any device is not provided (that is, if pre-tilt is not provided), the direction that the liquid crystal molecules are tilted cannot be controlled. As a result, alignment disorder (disclination) occurs and display defect, such as light leakage, occurs, so that display characteristic may be deteriorated. Therefore, in the case where the vertical alignment mode is employed, it is important to control the alignment direction, when a voltage is applied, of the liquid crystal molecules.

For the reason, in the liquid crystal display device of the invention, a liquid-crystal-layer thickness-adjusting layer can be provided in the reflective display region. For example, the thickness of the liquid crystal layer in the reflective display region may be about a half of the thickness of the liquid crystal layer in the transmissive display region. In this case, since the retardations in the reflective and transmissive display regions are substantially equal to each other, it is possible to improve the contrast in the both the display modes.

In addition, the transflective liquid crystal display device can be provided with liquid-crystal-layer thickness-adjusting layer, the alignment direction of the liquid crystal molecules is controlled by providing electrode slits and convex portions as alignment controlling means. In case of the electrode slit, an opening portions having shape of slit is provided in an electrode to generate a transverse electric field, and the tilting direction of the liquid crystal molecules is controlled based on the transverse electric field. In addition, in case of the convex portion, the tilting direction of the liquid crystal molecules is controlled in accordance with the shape of the convex portion. For example, in case of a convex portion having an inclined surface, the tilting direction of the liquid crystal molecules is controlled along its inclined surface.

In the liquid crystal display device of the invention, although the tilting direction of the liquid crystal molecules are controlled with the aforementioned alignment controlling device, since the liquid-crystal-layer thickness-adjusting layer is provided, only the electrode slit is selectively provided in the reflective display region on the substrate where the liquid-crystal-layer thickness-adjusting layer is formed, and at least the convex portion is selectively provided in the transmissive display region.

The convex portion of the slit and the convex portion as the alignment controlling device have a relatively strong alignment controlling force exerted on the liquid crystal molecules. This is because the direction that the liquid crystal molecules are tilted is controlled along the shape of the convex portion, and because the convex portion has an effect of distorting the electric field. Therefore, it is preferable that the direction that the liquid crystal molecules are tilted be controlled by forming the convex portions in both the reflective and transmissive display regions.

However, since the thickness of the liquid crystal layer in the both the display regions is adjusted, if the heights of the convex portions in both the display regions are the same, the display characteristics of the display regions may be different. In other words, although the higher convex portion provides the stronger alignment controlling force, since the pre-tilt is provided along the shape of the convex portion in an initial state, too higher convex portions may generate light leakage when a voltage is applied. In addition, in a case where the convex portion is made of a dielectric material, if the height of the convex portion is too high, electrical charge is accumulated in the convex portion when the voltage is applied. Therefore, even if a voltage is applied later, the alignment of the liquid crystal molecules may not change. The so-called burn-in may occur. For this reason, it is preferable that the height of the convex portion is adjusted in accordance with the thickness of the liquid crystal layer. For example, if the height of the convex portion to be formed in the reflective display region having a smaller liquid crystal layer thickness is smaller than that of the convex portion to be formed in the transmissive display region, it is possible to suitably control the alignment in both the reflective and transmissive display regions, and in particular, to reduce light leakage or burn-in in the reflective display region having a smaller liquid crystal layer thickness. However, since the convex portions are formed in the display regions in separate processes, there is a problem in that it takes too much time to adjust the heights of the convex portions.

In order to avoid the problem occurring in forming the convex portions, it is considered that the tilting direction of the liquid crystal molecules are controlled by forming electrode slits in both the reflective and transmissive display regions. However, as described above, the alignment controlling force is weaken and, when the slit is formed by using an etching process on the electrode, the etching rate varies in accordance with the presence of the liquid-crystal-layer thickness-adjusting layer on the base of the electrode. Therefore, it is difficult to form the slits in both the reflective and transmissive display regions by using the same process. Moreover, even though the slits are formed using the same process, a desired shape of slits may not be obtained. This is because crystalline structure of the electrode formed by using a sputtering method is dependent on the base material.

As a result, in the liquid crystal display device of the invention, since the thickness of the liquid crystal layer in the reflective display region is relatively thin, the tilting direction of the liquid crystal molecules can be suitably controlled by a relatively weak alignment controlling force. Therefore, only the electrode slit is formed in the reflective display region. On the other hand, since the thickness of the liquid crystal layer in the transmissive display region is relatively large, at least the convex portion having a relatively strong alignment controlling force is formed. By this exemplary construction, it is not necessary to adjust the height of the convex portions, and to obtain a desired shape of electrode slits by performing even a single process. In addition, since the alignment controlling forces are different from each other in accordance with the thickness of the liquid crystal layer, it is possible to prevent a problem that the alignment controlling force exerted on the liquid crystal molecules in one of the display region is weaken. As a result, display defects, such as light leakage, can be prevented in both the reflective and transmissive display regions, so that it is possible to suppress an afterimage or spotted pattern, and moreover, to provide a liquid crystal display device having a high viewing angle.

In the aforementioned liquid crystal display device, the convex portion formed in the transmissive display region and the liquid-crystal-layer thickness-adjusting layer formed in the reflective display region may be formed on the same layer with the same material. In this case, since an additional element for the convex portion is not needed, the convex portion can be formed in the same process as that for the liquid-crystal-layer thickness-adjusting layer. In addition, since the convex portion can be simply and easily added, it is possible to reduce the production cost.

In the liquid crystal display device of the invention, electrode slits or convex portions may be formed between the electrode formed in the reflective display region and the convex portion formed in the transmissive display region on the substrate opposite to the substrate where the liquid-crystal-layer thickness-adjusting layer is formed. In this case, since the discontinuous portion, that is, alignment disorder (disclination) of the liquid crystal molecules hardly occur between the electrode formed in the reflective display region and the convex portion formed in the transmissive display region, it is possible to further prevent display defects, such as light leakage.

In addition, the convex portions referred in the invention may have a structure to control the direction that the vertically aligned liquid crystal molecules are tilted, in accordance with a change in an electric field. More specifically, the structure includes preferably protrusions having a shape of a circular cone or a polygonal pyramid. And, it is preferable that the convex portion has a surface (an inclined surface) inclined by a predetermined angle with respect to the vertical alignment direction of the liquid crystal molecules. In addition, it is preferable that the inclined surface of the convex portion has a maximum angle of inclination of 5° to 40°. Here, the angle of inclination is an angle between a substrate and the inclined surface of the convex portion. In a case where the convex portion has a curved surface, the angle of inclination is an angle between the substrate and the tangential plane of the curved surface. If the maximum angle of inclination is less than 5°, the direction that the liquid crystal molecules are tilted may be not easily controlled. In addition, it the maximum angle of inclination is more than 10°, light leakage may occur at the associated position, so that contrast may be lowered.

In addition, it is preferable that the protruding height of the convex potion is in a range of 0.5 µm to 2.5 µm. If the protruding height is less than 0.5 µm, the direction that the liquid crystal molecules are tilted may not be easily controlled. In addition, if the protruding height is more than 2.5 µm, light leakage increases near the convex portion, so that the display characteristic may be deteriorated. The height of the convex portion is more preferably in a range of 1.0 µm to 1.5 µm. In this case, it is possible to obtain a better display.

In addition, in the liquid crystal display device of the present invention comprising a pair of substrate, that is, upper and lower substrates, a backlight may be provided on the side of the lower substrate opposite to the liquid crystal layer, and a reflecting film may be selectively provided only on the reflective display region on the side of the lower substrate facing the liquid crystal layer. In this case, a layer for providing evenness to the reflecting film may be formed in the reflective display region to be used as light scattering means.

Next, the electronic apparatus of the present invention comprises the aforementioned liquid crystal display device. Accordingly, it is possible to suppress display defect such as an afterimage or spotted pattern, and moreover, to the electronic apparatus provided with a display unit having good display characteristic, such as a wide viewing angle.

BRIEF DESCRIPTION OF THE DRAWINGS

The invention will be described with reference to the accompanying drawings, wherein like numerals reference like elements, and wherein:

FIG. 4 is a view for explaining the operation of the liquid crystal display device according to the first exemplary embodiment;

DETAILED DESCRIPTION OF PREFERRED EMBODIMENTS

Figure 1:
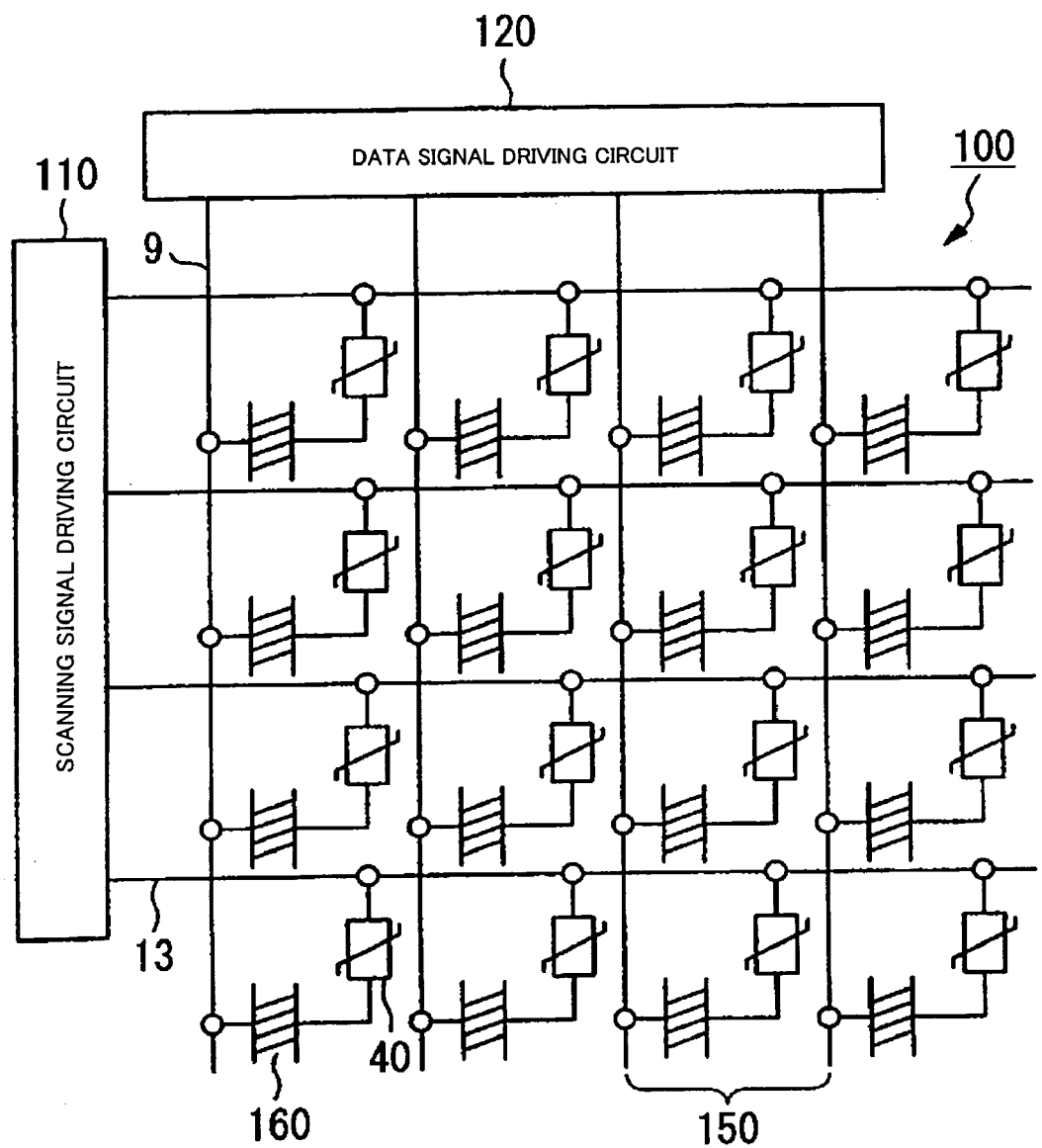
FIG. 1 is an equivalent circuit diagram showing a liquid crystal display device according to a first exemplary embodiment of the invention.

Now, exemplary embodiments of the invention will be described with reference to the drawings. In the drawings, scales of layers and elements are different from the real ones in order to represent them in recognizable sizes.

An exemplary liquid crystal display device of the invention is an example of an active matrix liquid crystal display device using thin film diodes (hereinafter, referred to as TFDs) as switching elements, and more particularly, a transflective liquid crystal display device capable of performing reflective display and transmissive display.

FIG. 1 is an equivalent circuit diagram showing a liquid crystal display device 100 according to the embodiment. The liquid crystal display device 100 can include a scanning signal driving circuit 110 and a data signal driving circuit 120. The liquid crystal display device 100 is provided with signal lines of a plurality of scanning lines 13 and a plurality of data lines 9 intersecting the scanning lines 13. The scanning lines 13 are driven by a scanning line driving circuit 110, and the data lines 9 are driven by a data line driving circuit 120. In each of the pixel regions 150, a TFD element 40 and a liquid crystal display element 160 (a liquid crystal layer) are serially connected between one of the scanning lines 13 and one of the data lines 9. In addition, although the TFD elements 40 and the liquid crystal display elements 160 are connected to the scanning lines 13 and the data lines 9, respectively, the TFD elements 40 and the liquid crystal display elements 160 may be connected to the data lines 9 and the scanning lines 13, respectively.

Figure 2:
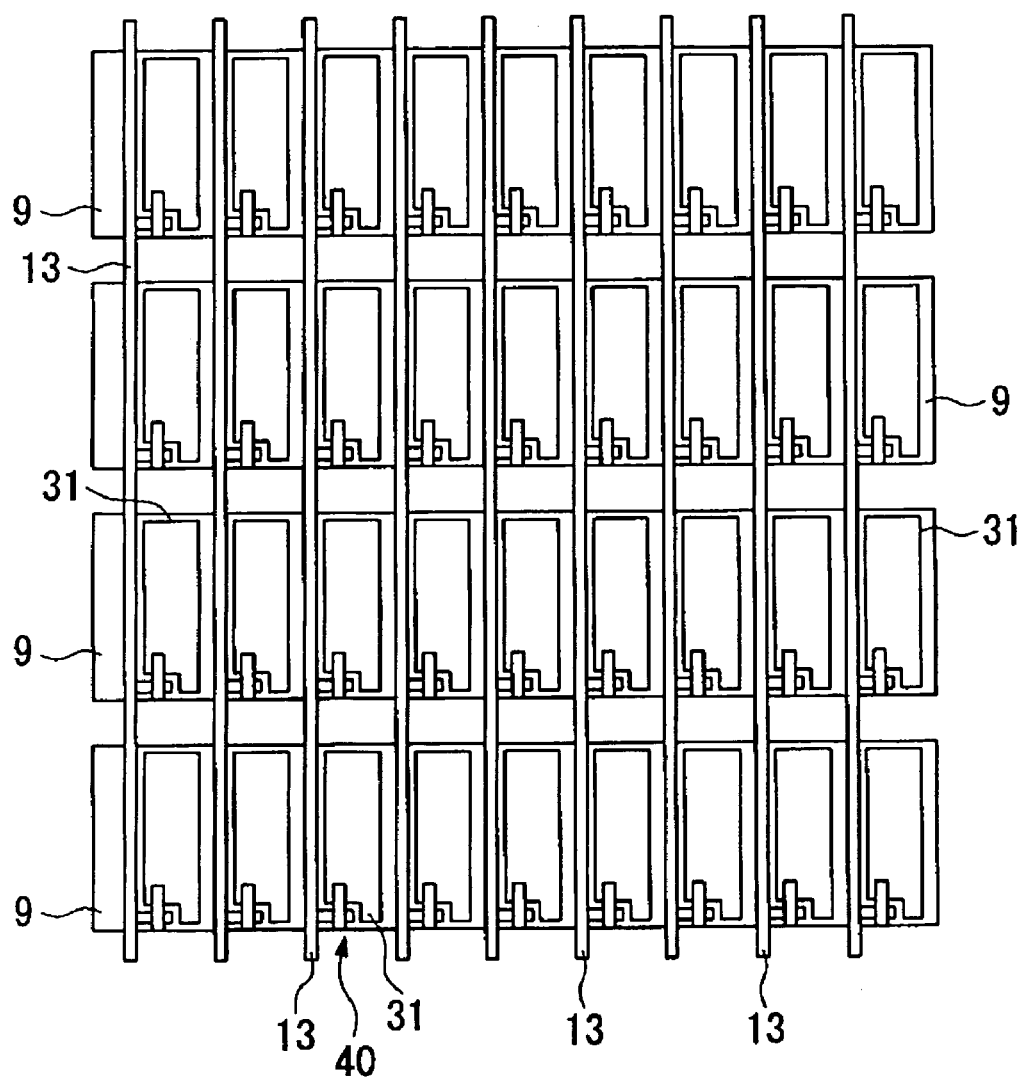
FIG. 2 is a schematic plan view showing the construction of electrodes of the liquid crystal display device according to the first exemplary embodiment of the invention.

Now, the structure in plan view of electrodes (the structure of pixels) of the liquid crystal display device 100 according to the embodiment will be described with reference to FIG. 2. As shown in FIG. 2, in the liquid crystal display device 100 according to the invention, pixel electrodes 31 having a rectangular shape in plan view are provided in a matrix and connected via the TFD elements 40 to the scanning liens 13. Common electrodes 9 facing the pixel electrodes 31 in the vertical direction in the figure are provided in a stripe. Each of the common electrodes 9 made of the data line has a shape of a stripe intersecting the scanning lines 13. In the embodiment, one dot region is a region where each of the pixel electrodes 31 is formed. In the dot regions in a matrix, the TFD element 40 is provided so that the dot regions can be individually displayed.

The TFD element 40 is a switching element for connecting one of the scanning lines 31 and one of the pixel electrodes 31. The TFD element 40 is constructed in a MIM structure having a first conductive film containing Ta as a main component, an insulating film, containing $Ta_2O_3$ as a main component, formed on the surface of the first conductive film, a second conductive film, containing Cr as a main component, formed on the surface of the insulating film. The first and second conductive films of TFD element 40 are connected to the scanning lines 13 and the pixel electrode 31, respectively.

Figure 3A:
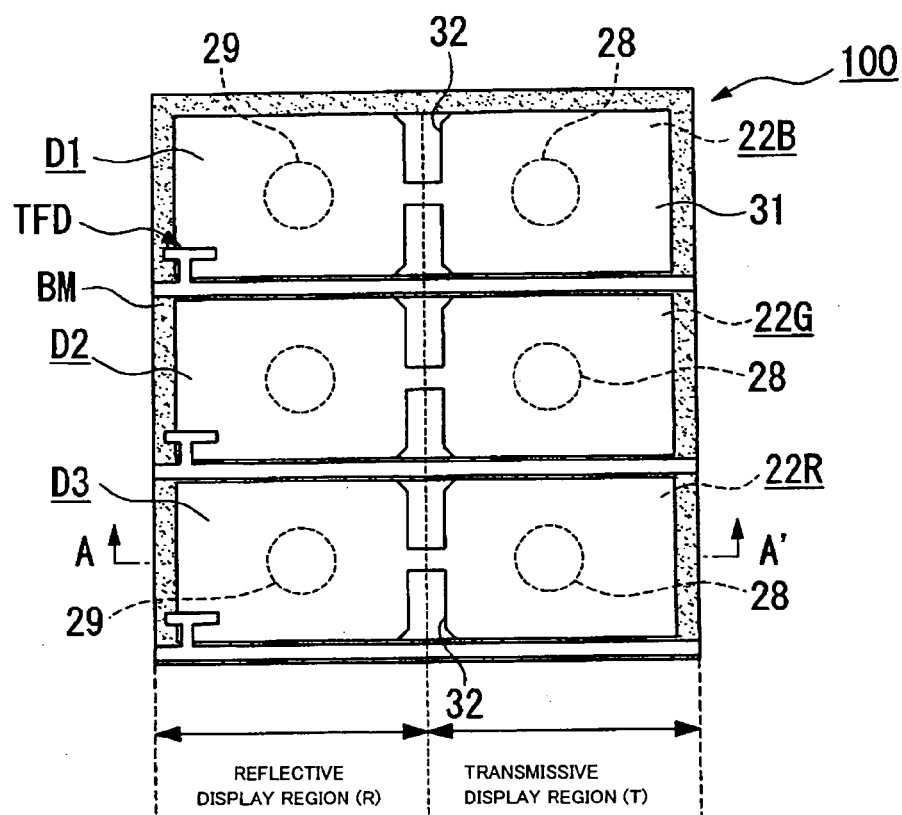
FIG. 3 is schematic plan and sectional views showing main parts of the liquid crystal display device according to the first exemplary embodiment of the invention.
Figure 3B:
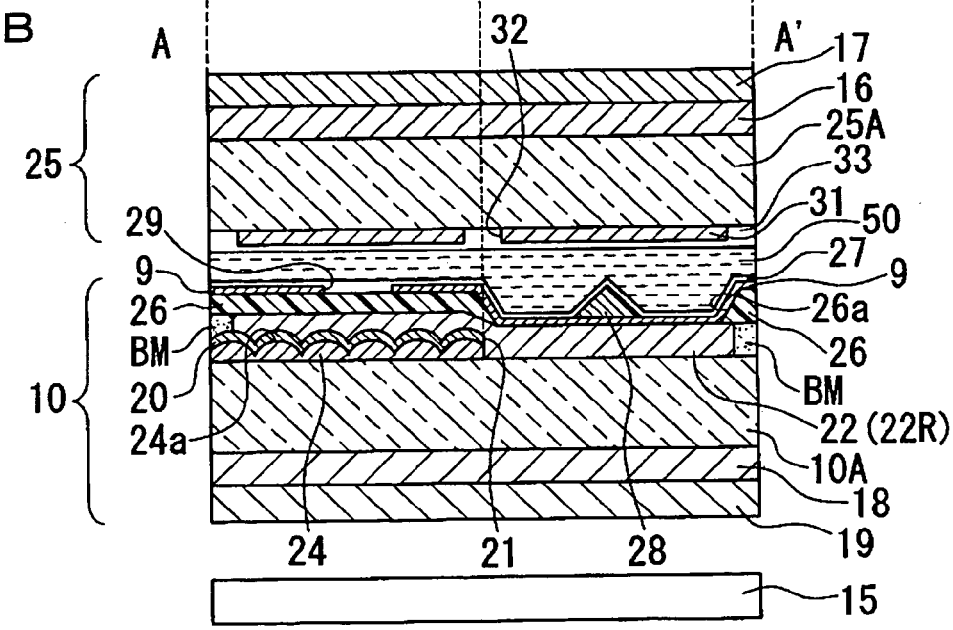

Now, the construction of the pixels of the liquid crystal display device 100 according to the exemplary embodiment will be described with reference to FIG. 3. FIG. 3(a) is a schematic diagram showing the construction of the pixels of the liquid crystal display device 100, and more particularly, a schematic diagram showing the structure in plan view of the pixel electrodes 31. FIG. 3(b) is a schematic sectional view taken along the line A–A' of FIG. 3(a). The liquid crystal display device 100 has the dot region comprising the pixel electrodes 31 near intersections of the data lines 9 and the scanning lines 13 as shown in FIG. 2. As shown in FIG. 3(a), the pixels are provided in the dot regions. One colored layer having one color of three primary colors is provided corresponding to one dot region. The pixels including the colored layers 22B (blue), 22G (green) and 22R (red) are formed in the three dot regions D1, D2, and D3, respectively.

As shown in FIG. 3(b), the liquid crystal display device 100 can include an upper substrate 25 (an element substrate), a lower substrate 10 (a counter substrate) opposite to the upper substrate, and a liquid crystal layer 50 interposed between the upper and lower substrates and made of liquid crystal whose initial alignment state is vertical, that is, whose dielectric anisotropy is negative.

The lower substrate 10 can be formed by partially covering a substrate main body 10A made of a light-transmitting material, such as quartz and glass, with a reflecting film 20 made of a metallic film having a high reflectance, such as aluminum and silver films, with an insulating film 24 therebetween. A region where the reflecting film 20 is formed becomes the reflective display region R, and a region where the reflecting film 20 is not formed, that is, an interior region of an opening 21 of the reflecting film 20b, becomes the transmissive display region T. Like this, the liquid crystal display device 100 according to the embodiment is vertically aligned liquid crystals display device comprising vertically aligned liquid crystals layer 50 to perform reflective display and transmissive display.

The insulating film 24 formed on the substrate main body 10A has unevenness 24a on its surface, so that the surface of the reflecting film 20 can has unevenness 24 in imitation of the unevenness 24a. Since reflected light is scattered due to the unevenness, external reflection is prevented so that it is possible to obtain a wide viewing angle of display. The insulating film 24 having the unevenness 24a can be formed by patterning, for example, resin resist and coating one resin layer thereon. Alternatively, the patterned resin resist may be subjected to heat treatment in order to adjust the unevenness shape.

A color filter 22 (a red colored layer 22R in FIG. 3(b)) is provided on the reflecting film 20 located in the reflective display region R and the substrate main body 10A located in the transmissive display region T to extend over the reflective display region R and the transmissive display region T. A black matrix BM made of metal chromium is surrounded by the peripheral edge of the red colored layer 22R so that boundaries of the dot regions D1, D2 and D3 can be defined by the black matrix BM.

An insulating film 26 is provided at a position corresponding to the reflective display region R on the color filter 22. In other words, the insulating film 26 is selectively formed above the reflecting film 20 via the color filter 22, and due to the formation of the insulating film 36, the thickness of the liquid crystal layer 50 in the reflective display region R is different from that in the transmissive region T. The insulating film 26 is an organic film made of acryl resin having a film thickness of, for example, 0.5 to 2.5 µm, and comprises an inclined surface near the boundary between the reflective display region R and the transmissive display region T, so that the thickness of the layer can be continuously changed. The liquid crystal layer 50 where the insulating film 26 does not exist has a thickness of about 1 to 5 µm (for example, 4 µm). The thickness (for example, 2 µm) of the liquid crystal layer 50 in the reflective display region R is about a half of the thickness of the liquid crystal layer 50 in the transmissive display region T. As a result, the insulating film 26 serves as a liquid-crystal-layer thickness-adjusting layer (a liquid crystal layer thickness controlling layer) for varying the thickness of the liquid crystal layer 50 in the reflective and transmissive display regions R and T in accordance with the thickness of the insulating film.

The common electrode 9 made of indium tin oxide (hereinafter, referred to as ITO) is formed in a stripe on the color filter 22 and the insulting film 26. In FIG. 3, the common electrode 9 is formed in a stripe to extend in a direction vertical to the figure, so that the common electrode can serve as an electrode common to the dot regions arranged in the direction vertical to the figure. In addition, in the embodiment, although the reflecting film 20 and the common electrode 9 are separately formed, the reflecting film may be used as a portion of the common electrode made of metal in the reflective display region R.

In the common electrode 9, a slit 29 formed by cutting a portion of the common electrode is provided in only the reflective display region R. In the exemplary embodiment, as shown in FIG. 3(a), the slit 29 has a shape of circle. In a region where the slit 29 is formed, a transverse electric field is generated between the slit and the pixel electrode 31 on the opposite substrate.

On the other hand, a convex portion 28 made of a dielectric material is provided on the common electrode 9 in only the transmissive display region T. The convex portion 28 has a function of a sandwiching surface that gives a convex shape protruding from the inner surface of the lower substrate 10 of the liquid crystal layer 50. The convex portion is formed to have a height of about 1 to 1.5 µm and a width of about 10 to 15 µm by using a nobolac-based positive resist, and more specifically, to has a gently inclined surface by developing the resist and performing a post-baking process at a temperature of about 220° C.

In addition, an alignment film 27 made of polyimide or the like is provided on the common electrode 9 including the convex portion 28. The alignment film 27 serves as a vertical alignment film for vertically aligning liquid crystal molecules to the surface of the alignment film. The alignment film is not subjected to other alignment process, such as rubbing.

In the upper substrate 25, the pixel electrodes 31 in a matrix made of a transparent conductive film, such as ITO, and alignment films 33 made of polyimide are formed on the substrate main body 25A made of a light-transmitting material, such as quartz and glass, (more specifically, the liquid crystal layer on the substrate main body 25A. Here, the alignment film in the upper substrate is subjected to the same alignment process as that in the lower substrate 10. On each of the pixel electrodes 31 formed in the upper substrate 25, an electrode slit 32 is formed to be located between the convex portion 29 and the electrode slit 28 formed in the lower substrate 10.

On the outer side of the lower substrate 10 (the side opposite to the surface used to interpose the liquid crystal layer 50), a phase difference plate 18 and a polarizing plate 19 are formed, and on the outer side of the upper substrate, a phase difference plate 16 and a polarizing plate 17 are formed, so that circularly polarized light can enter the inner surface of the substrate (the liquid crystal layer 50). Here, the phase difference plate 18 and the polarizing plate 19, and the phase difference plate 16 and the polarizing plate 17 constitute circularly polarizing plates, respectively. The polarizing plate 17 (or 19) is constructed to pass only linearly polarized light having a predetermined polarization axis, and the phase difference plate 16 (or 18) utilizes a λ/4 phase difference plate. In addition to the aforementioned circularly polarizing plate, a combination of a polarizing plate, a λ/2 phase difference plate, and a λ/4 phase difference plate may be used in order to obtain more-achromatically-colored black display. In addition, a combination of a polarizing plate, a λ/2 phase difference plate, a λ/4 phase difference plate, and c plate (a phase difference plate having its optical axis in the direction of thickness thereof) may be used in order to obtain a wider viewing angle. A backlight 15 as a transmissive display light source is provided on an outer side of the polarizing plate 19 formed on the lower substrate 10.

In the liquid crystal display device 100 according to the embodiment, in order to control the alignment of the liquid crystal molecules in the liquid crystal layer 50, that is, in order to control the tilting direction of the liquid crystal molecules vertically aligned in its initial state when a voltage is applied between the electrodes, the convex portion 28 as a protrusion made of a dielectric material is formed on the inner side (the liquid crystal layer side) of the lower substrate 10 in the transmissive display region T, and the slit 29 is formed on the common electrode 9 of the lower substrate 10 in the reflective display region R. On the other hand, in order to control the alignment of the liquid crystal molecules, a slit 32 is formed in the pixel electrode 31 of the upper substrate 25 between the convex portion 28 and the slit 29 as seen in plan view.

By using the alignment controlling device composed of the convex portion 28, the slit 29 and the slit 32, the tilting direction of the liquid crystal molecules when a voltage is applied can be suitably controlled. More specifically, as shown in FIG. 4, the tilting direction of the liquid crystal molecules is controlled along the inclined surface of the convex portion 28, and the tilting direction of the liquid crystal molecules is controlled in accordance with the electric field generated by the formation of the electrode slits 29 and 32. In addition, since adjacent ones of the convex portions 28, the slits 29, and the slits 32 are provided on different substrates, a region where the tilting direction of the liquid crystal molecules becomes discontinuous is hardly generated.

According to the liquid crystal display device 100 having the aforementioned construction, the following preferred operation and effects can be obtained.

First, in the liquid crystal display device 100, since the thickness of the liquid crystal layer 50 in the reflective display region R can be formed to be about a half of the thickness of the liquid crystal layer 50 in the transmissive display region T by selectively providing the insulating film 26 in the reflective display region R, it is possible to substantially equalize the retardation that contribute to the reflective display to the retardation that contributes to the transmissive display. Therefore, it is possible to improve the contrast.

In general, in a case where a voltage is applied to liquid crystal molecules having a negative dielectric anisotropy aligned on a vertical alignment film not subjected to rubbing, the direction that the liquid crystal molecules are tilted is not controlled. Therefore, the alignment irregularity occurs. However, in the exemplary embodiment, since the convex portion 28 as a device for controlling the direction that the liquid crystal molecules are tilted are formed on the common electrode 9 in the transmissive display region R and the electrode slit 29 as the devices are formed in the reflective display region R, the aforementioned alignment controlling force can be generated, so that the tilting direction of the liquid crystal molecules vertically aligned in its initial state when a voltage is applied can be controlled. As a result, since the disclination due to the alignment disorder of liquid crystal can be suppressed, a high-quality display without an afterimage due to the disclination or a spotted pattern observed in the oblique direction on the display surface of the liquid crystal display device can be obtained.

In addition, in the liquid crystal display device 100 according to the exemplary embodiment, on the lower substrate 10 where the insulating film 26 for adjusting the thickness of the liquid crystal layer is formed, only the slit 29 as the alignment controlling device is formed in the reflective display region R, and at least the convex portion 28 as the alignment controlling device can be formed in the transmissive display region T.

In a case where the convex portions as the alignment controlling devices are provided in the display regions R and T on the lower substrate 10 where the insulating film 26 is formed, if the convex portions have the same height, the liquid crystal layers in the display regions R and T have different thicknesses, so that an alignment controlling force in the transmissive display region can be relatively weak. On the other and, since the liquid crystal molecule has a pre-tilt in an initial state in accordance with the shape of the convex portion in the reflective display region R and the thickness of the liquid crystal layer is relatively thin, light leakage due to the pre-tilt may be more easily occur.

In addition, In a case where the electrode slits as the alignment controlling devices are formed in the display regions R and T on the lower substrate 10 where the insulating film 26 is formed, since the bases in the reflective and transmissive display regions R and T are the color filter 22 and the insulating film 26, respectively, the base materials in the display regions R and T are different. Therefore, the different etching conditions in the display regions R and T are needed. In addition, if the slits are formed in the same condition, there is a problem in that a desired shape of the slit may not be obtained. Otherwise, in order to form the bases of the electrodes in the display regions R and T with the same material, study on which additional common base layers are separately formed in the display regions R and T may be needed.

Like this, it the same type of the alignment controlling devices are provided in both the display regions R and T, malfunction may occur in any display mode. In consideration of the problem, in the embodiment, different types of the alignment controlling means are provided in the display regions R and T. Therefore, as described above, in the lower substrate 10 where the insulating film 26 is formed, the slits 29 and the convex portions 28 are selectively provided in the reflective and transmissive display regions R and T, respectively. In addition, since the alignment controlling force in the convex portion is stronger than that in the slit, the slit 29 is provided in the reflective display region R where the thickness of the liquid crystal layer 50 is relatively thin, and the convex portion 28 is provided in the transmissive display region T where the thickness of the liquid crystal layer 50 is relatively thick, so that it is possible to control the alignment of the liquid crystal molecules suitable to the display regions. As a result, in the liquid crystal display device 100 according to the exemplary embodiment, since light leakage is prevented in both the reflective and transmissive display regions, it is possible to suppress display defects, such as an afterimage and a spotted pattern, and to obtain a wide viewing angle.

In addition, the shape of the convex portion 28 formed on the sandwiching surfaces of the liquid crystal layer 50 have a substantially symmetric cross section. More specifically, since the convex portion 28 has a shape of a substantially circular cone, the liquid crystal molecule can be tilted in all directions, so that it is possible to obtain wide viewing angles in the left, right, up and down directions of the display surface. In order to obtain the wide viewing angles, the convex portion 28 may preferably have a shape of an elliptic cone, a polygonal pyramid, a truncated circular cone, a truncated elliptic cone, a truncated polygonal pyramid, and a hemisphere.

In addition, although the width of the electrode slit 29 in the reflective display region R is preferably longer than the thickness of the liquid crystal layer in order to effectively use the transverse electric field, the display aperture ratio may be lowered. Therefore, the width of the electrode slit is preferably about 5 to 10 times the thickness of the liquid crystal layer, and more preferably, about 2 to 5 times the thickness of the liquid crystal layer. In the embodiment, the width of the electrode slit is 8 μm. Since the thickness of the liquid crystal layer in the reflective display region R is half of the thickness of the liquid crystal layer in the transmissive display region T, it is possible to obtain an effective slit width without the aperture ratio lowered. In addition, a plurality of the slits 29 and a plurality of the convex portions 28 may be provided in the reflective and transmissive display regions, respectively.

Figure 5A:
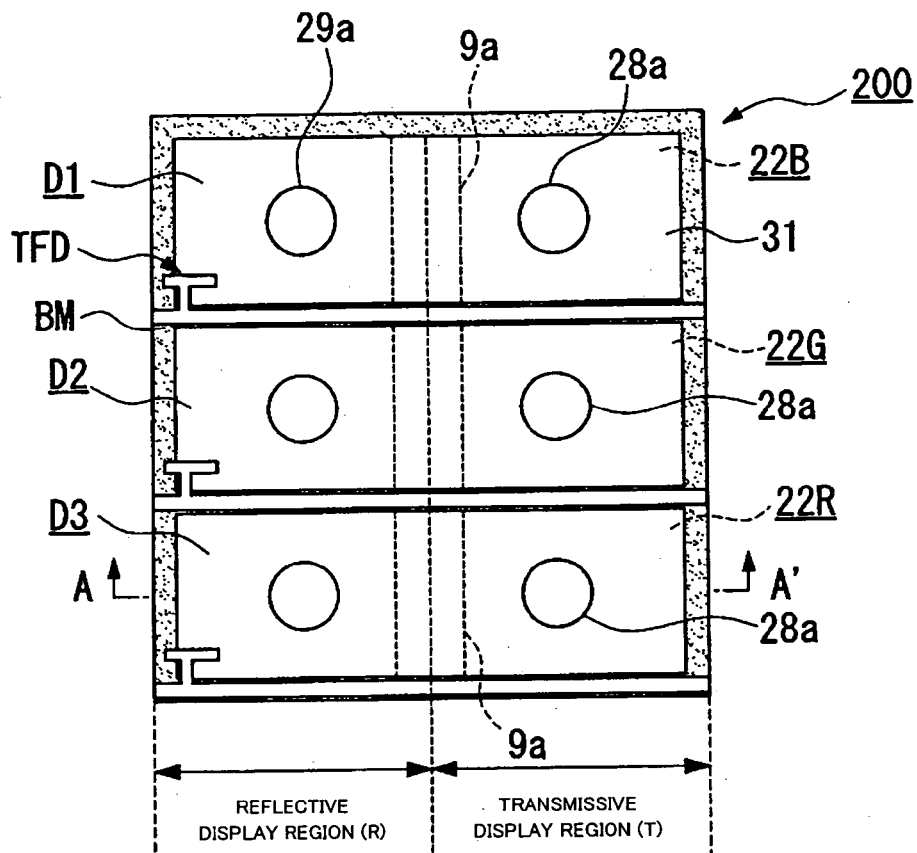
FIG. 5 is schematic plan and sectional views showing main parts of a liquid crystal display device according to a second exemplary embodiment.
Figure 5B:
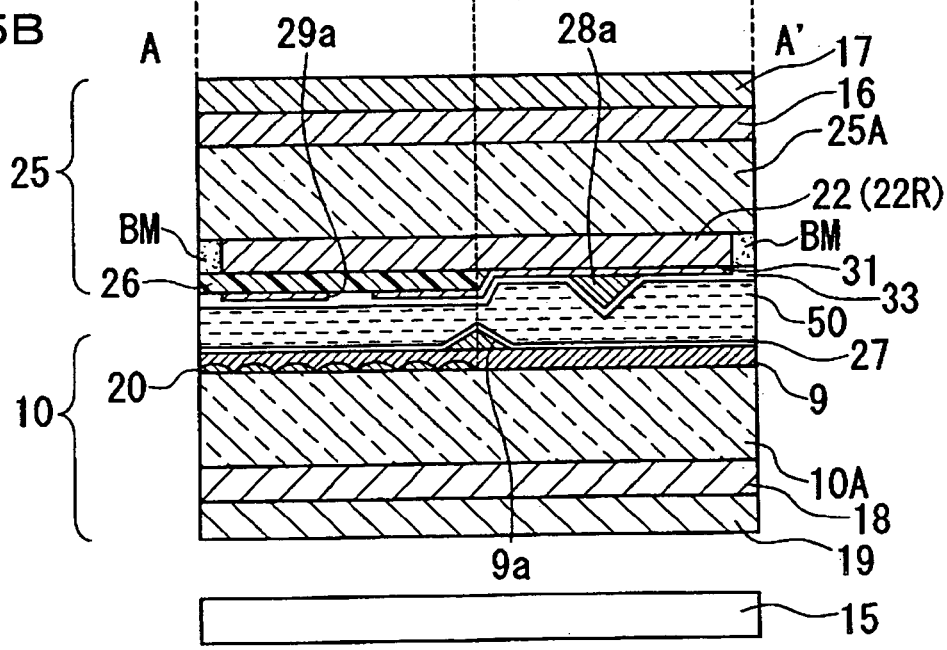

Now, a second exemplary embodiment of the invention will be described with reference to the drawings. FIG. 5 corresponding to FIG. 3 of the first exemplary embodiment is schematic plan and sectional views showing a liquid crystal display device 200 according to the second embodiment. The basic construction of the liquid crystal display device is similar to that of the first embodiment. The principal difference is that the insulating film 26 provided in the reflective display region R is formed on the upper substrate 25. Therefore, the components in FIG. 5 common to those in FIG. 3 are indicated by the same reference numerals, and their detailed description is omitted.

As shown in FIG. 5, the liquid crystal display device 200 according to the second exemplary embodiment, a color filter 22 (22R) is formed on the substrate main body 25A of the upper substrate (the liquid crystal layer 50 side, that is, the inner side), and an insulating film 26 as a liquid-crystal-layer thickness-adjusting layer is formed on the inner side. In addition, a pixel electrode 31 is formed on the inner side of the color filter 22 including the insulating film 26. In the pixel electrode 31, a slit 29a as an alignment controlling device in the reflective display region R and a convex portion 28a as an alignment controlling device in the transmissive display region T are formed on the pixel electrode 31.

A reflecting film 20 having unevenness is selectively formed on the substrate main body 10A of the lower substrate 10 in the reflective display region R, and a common electrode 9 is formed in a stripe on the substrate main body 10A including the reflecting film 20. A convex portion 9a as an alignment controlling device is formed on the common electrode 9 between the slit 29a and the convex portion 28a of the upper substrate 25.

In the liquid crystal display device 200 similar to the liquid crystal display device 100 according to the first exemplary embodiment, it is possible to efficiently control the alignment of the liquid crystal molecules in alignment direction, when a voltage is applied, of the liquid crystal molecule reflective display region R and the transmissive display region T. In particular, in liquid crystal display device 200 according to the embodiment, since the convex portion 9a as the alignment controlling means is formed on the lower substrate 10 rather than the upper substrate 25 where the insulating film 26 is formed, it is possible to further efficiently control the alignment of the liquid crystal molecules.

Now, a third exemplary embodiment of the invention will be described with reference to the drawings.

Figure 6A:
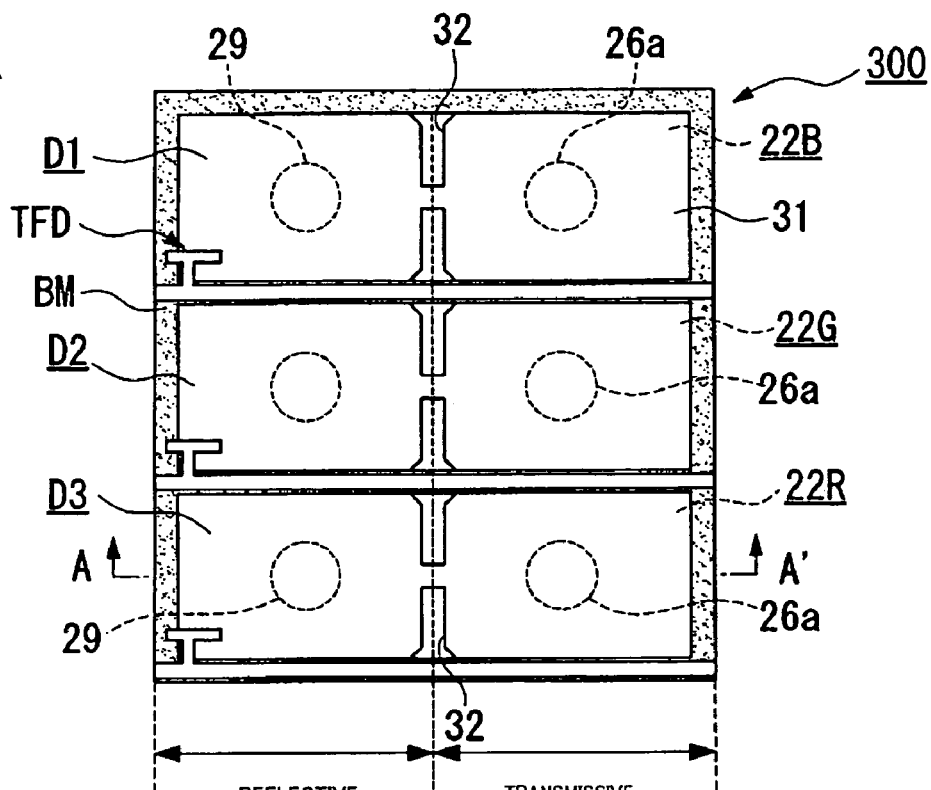
FIG. 6 is schematic plan and sectional views showing main parts of a liquid crystal display device according to a third exemplary embodiment.
Figure 6B:
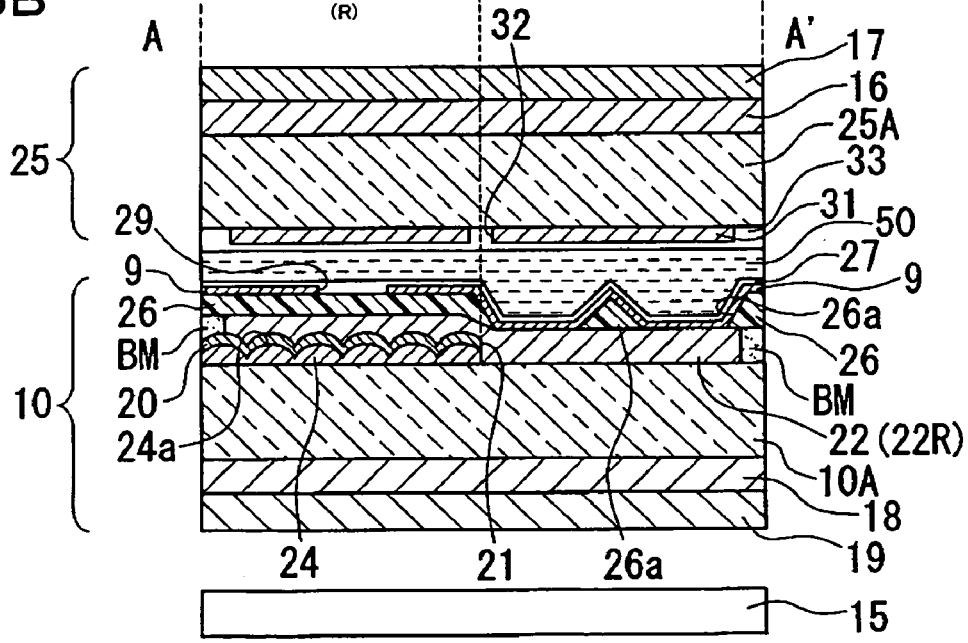

FIG. 6 corresponding to FIG. 3 of the first exemplary embodiment is schematic plan and sectional views showing a liquid crystal display device 300 according to the third embodiment. The basic construction of the liquid crystal display device is similar to that of the first embodiment. The principal difference is that a convex portion formed in the transmissive display region T has a different construction. Therefore, the components in FIG. 6 common to those in FIG. 3 are indicated by the same reference numerals, and their detailed description is omitted.

As shown in FIG. 6, in the liquid crystal display device 300 according to the third embodiment, the convex portion 26a formed in the transmissive display region T and the insulating film 26 as a liquid-crystal-layer thickness-adjusting layer are formed in the same process, so that the convex portion 26a formed in the transmissive display region T is formed on the same layer with the same material as the insulating film 26.

In other words, resin layers having predetermined patterns are formed on the reflective display region R and the transmissive display region T. The resin layer on the reflective display region R is used as the insulating film 26 which is a liquid crystal thickness adjusting layer, and the resin layer on the transmissive display region T is used as the convex portion 26a for providing a convex shape to a sandwiching surface of the liquid crystal layer 50 in the transmissive display region T. In addition, a slit may be simultaneously formed in the electrode on the convex portion 26a in the same etching condition when the slit is formed in the reflective display region R. As a result, due to the synergistic effect of the slits and the convex portions, it is possible to more effectively control the alignment of the liquid crystal molecules.

As described above, in the liquid crystal display device 300 according to the exemplary embodiment, since the convex portion 26a as the alignment controlling means of liquid crystal molecules in the transmissive display region T is formed in the same process as the insulating film 26 as the alignment controlling means of liquid crystal molecules in the reflective display region R, it is possible to efficiently manufacture the liquid crystal display device without extra manufacturing processes, so that the production cost can be reduced.

Now, specific examples of an electronic apparatus comprising a liquid crystal display device according to the embodiments of the invention will be described.

Figure 7:
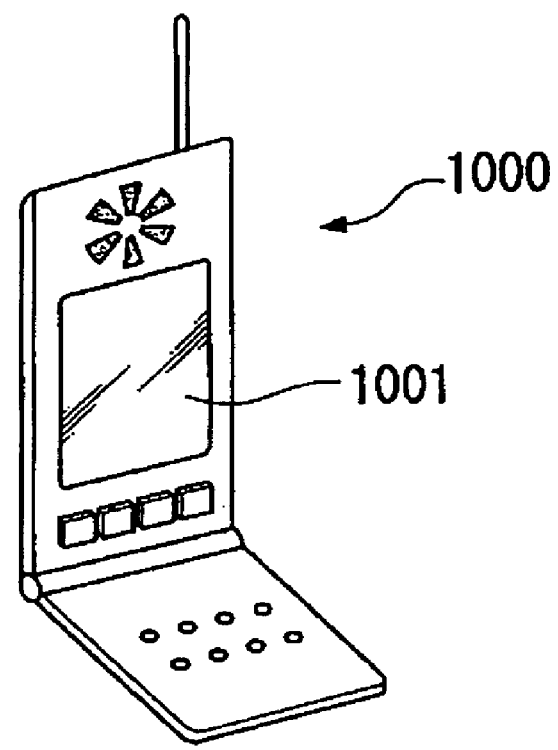
FIG. 7 is a perspective view showing an example of an electronic apparatus of the invention.

FIG. 7 is a perspective view showing an example of a cellular phone. In FIG. 7, the reference numeral 1000 indicates a main body of the cellular phone, and the reference numeral 1001 indicates a display unit using the liquid crystal display device. If the liquid crystal display device of the exemplary embodiments is used as the display unit of the electronic apparatus, such as the cellular phone, it is possible to implement an electronic apparatus having a high brightness, a high contrast, and a wide viewing angle irrespective of its operational environment.

In addition, it should be understood that the technical scope of the invention is not limited to the aforementioned embodiments, but the invention can be modified without departing from the spirit of the invention. For example, although the invention is applied to an active matrix liquid crystal display device using TFD as a switching element in the aforementioned embodiment, the invention may be applied to a passive matrix liquid crystal display device rather than the active matrix liquid crystal display device using the TFDs as switching elements.

Examples of the liquid crystal display device 100 according to the first exemplary embodiment are constructed in the following conditions. The thickness of the liquid crystal layer in the transmissive display region T is 4.0 μm, the thickness of the liquid crystal layer in the reflective display region R is 2.0 μm, and the height of the convex portion 28 is 1.5 μm. On the inner surface of the lower substrate 10, the convex portion 28 or the slit (instead of the convex portion 28) is formed in the transmissive display region T. Various widths of the convex portion or the slit are selected. Then, states of the transmissive display of the examples are evaluated and compared. The result of the comparison is shown in Table 1 as follows.

TABLE 1

| Width of convex portion or slit | 10 μm | 13 μm | 15 μm |
|---|---|---|---|
| When the convex portion is formed in the transmissive display region | ○ | ○ | ○ |
| When the slit is formed in the transmissive display region | X | Δ | ○ |

○: Good display with no spotted pattern
Δ: Spotted pattern is intermittently observed
X: Spotted pattern is observed on the entire surface As shown in the table, it can be understood that, if the convex portion is used as an alignment controlling device in the transmissive display region T, it is possible to obtain a relatively better display without a spotted pattern.

Similarly, other examples of the liquid crystal display device 100 according to the first embodiment are constructed with the following conditions. The thickness of the liquid crystal layer in the transmissive display region T is 4.0 μm, the thickness of the liquid crystal layer in the reflective display region R is 2.0 μm, and the height of the convex portion 28 is 1.5 μm. On the inner surface of the lower substrate 10, the slit 29 or convex portion (instead of the slit) is formed in the reflective display region R. Various widths of the convex portion or the slit are selected. Then, contrasts in the reflective display of the examples evaluated are compared. The result of the comparison is shown in Table 2 as follows.

TABLE 2

| Width of convex portion or slit | 5 μm | 8 μm | 12 μm |
|---|---|---|---|
| When the convex portion is formed in the transmissive display region | 9.6 | 8.7 | 6.8 |
| When the slit is formed in the transmissive display region | 16.7 | 15.6 | 14.3 |

As shown in the table, it can be understood that, the spotted pattern are not detected in all cases where any one of the slit and the convex portion is formed, and moreover, a reflective display having a relatively high contrast can be obtained in the case where the slit is formed.

It can be understood from the aforementioned results that it is possible to obtain a good display with a high contrast and low spotted pattern by providing the convex portion as an alignment controlling device in the transmissive display region T and the slit as an alignment controlling device in the reflective region R.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:
1. A liquid crystal display device, comprising:
liquid crystal layer that includes liquid crystal having a negative dielectric anisotropy and that is interposed between a first substrate and a second substrate;
a transmissive display region and a reflective display region provided in each dot region of the first substrate and the second substrate;
a first electrode provided on the first substrate;

a second electrode provided on the second substrate and facing the first substrate;

a liquid-crystal-layer thickness-adjusting layer that is formed in the reflective display region of the first substrate so that a thickness of the liquid crystal layer in the reflective display region is smaller than the thickness of the liquid crystal layer in the transmissive display region;

a first electrode slit that is formed by cutting a portion of the first electrodes and that controls the tilting direction of a liquid crystal molecule of the liquid crystal layer, the first electrode slit being formed on the liquid-crystal-layer thickness-adjusting layer;

a convex portion that protrudes from a surface of a liquid crystal layer side of the first substrate and that controls a tilting direction of the liquid crystal molecules; and a second electrode slit that is formed by cutting a portion of the first electrode and that controls the tilting direction of a liquid crystal molecule of the liquid crystal layer, the second electrode slit being formed on the convex portion;

wherein all of the first electrode slit, the second electrode slit and the convex portion are formed on the first substrate.

2. The liquid crystal display device according to claim 1, a third electrode slit or another convex portion being further formed on the second substrate between one of the first and second electrode slits formed in the reflective display region and the convex portion formed in the transmissive region.

3. The liquid crystal display device according to claim 1, the convex portion having an inclined surface that controls the tilting direction of vertically aligned liquid crystals when a voltage is applied.

4. The liquid crystal display device according to claim 1, the first and second electrode slits generating a transverse electric field that controls the tilting direction, when a voltage is applied, of vertically aligned liquid crystals.

5. An electronic apparatus, comprising the liquid crystal display device according to claim 1.

* * * * *